United States Patent [19]

Hiraoka et al.

[11] Patent Number: 4,803,961
[45] Date of Patent: Feb. 14, 1989

[54] AIR SUCTION DEVICES FOR MULTICYLINDER ENGINES

[75] Inventors: Tetsuo Hiraoka, Hiroshima; Shinji Seike; Kouichi Hatamura, both of Hiroshima; Minoru Akizuki, Higashihiroshima, all of Japan

[73] Assignee: Mazda Motor Corporation, Hiroshima, Japan

[21] Appl. No.: 214,824

[22] Filed: Jul. 5, 1988

Related U.S. Application Data

[63] Continuation of Ser. No. 932,198, Nov. 18, 1986, abandoned.

[30] Foreign Application Priority Data

Nov. 19, 1985 [JP] Japan ............................. 60-259394
Nov. 19, 1985 [JP] Japan ......................... 60-177864[U]
Apr. 3, 1986 [JP] Japan ............................ 61-49028[U]

[51] Int. Cl.$^4$ ............................................. F02B 75/18
[52] U.S. Cl. ........................... 123/52 MV; 123/52 M; 123/52 MB
[58] Field of Search ......... 123/52 M, 52 MB, 52 MC, 123/52 MV

[56] References Cited

U.S. PATENT DOCUMENTS 4,549,506 10/1985 Rush, II et al. ............... 123/52 MB
4,649,871 3/1987 Hatamura et al. ............. 123/52 MV

FOREIGN PATENT DOCUMENTS 115818 9/1981 Japan .
175121 11/1983 Japan .
178421 11/1983 Japan .
34526 3/1985 Japan .
2117043 10/1983 United Kingdom .......... 123/52 MB Primary Examiner—Stephen F. Husar
Attorney, Agent, or Firm—Gerald J. Ferguson, Jr.

[57] ABSTRACT

An air suction device for a multicylinder engine comprises a first group of inlet passages each having one end connected to one of a first group of cylinders, a second group of inlet passages each having one end connected to one of a second group of cylinders, a surge chamber separated off by a partition-wall into first and second compartments for air expansion provided with a plurality of first openings each coupled with the other end of one of the first group of inlet passages and a plurality of second openings each coupled with the other end of one of the second group of inlet passages, respectively, and a valve unit including a body member forming an air passage and a closing valve disposed in the body member for closing selectively the air passage. The partition-wall is provided with a cutout portion thereon, and the valve unit is fitted to the cutout portion provided on the partition-wall in the surge chamber so as to form with the air passage thereof a connecting passage provided for interconnecting the first and second compartments and closed selectively by the closing valve.

19 Claims, 7 Drawing Sheets

AIR SUCTION DEVICES FOR MULTICYLINDER ENGINES

This application is a continuation, of Ser. No. 932,198, filed 11/18/86 now abandoned.

BACKGROUND OF THE INVENTION

1. Field of the Invention

The present invention relates generally to an air suction device for a multicylinder engine, and more particularly, to such an air suction device operative to effect a resonance supercharging in suction stroke of each of cylinders provided in a multicylinder engine and in result to improve air charge efficiency in the cylinders.

2. Description of the Prior Art

In a suction system provided for a multicylinder engine, an intake pressure vibration arises in an inlet passage in response to opening operations of inlet valves disposed in the inlet passage with a specific frequency which is determined in accordance with the configuration of the inlet passage. In connection with this fact, there has been previously proposed a method of charging air into cylinders provided in the multicylinder engine in which resonance supercharging is effected by making good use of the intake pressure vibration and thereby air is effectively charged into the respective cylinders, so that air charge efficiency in each of the cylinders is increased and the output torque characteristic of the engine is improved.

In an air suction device for a multicylinder engine to which the above mentioned method is applied, it is required for improving effectively air charge efficiency in each cylinder to cause the opening operation of each inlet valve disposed in an inlet passage to be performed in synchronism with the period of intake pressure vibration arising in the inlet passage. However, the size and configuration of the inlet passage is ordinarily fixed to be unchangeable, and this results in that usually the air charge efficiency in each cylinder is so restricted as to be improved effectively only when the engine is working at a selected speed within a relatively narrow range of speed extending around a specific speed at which the opening operation of each inlet valve is performed in synchronism with the period of the intake pressure vibration.

For the purpose of solving this problem, there has been also proposed an improved air suction device for a multicylinder engine, as disclosed in, for example, the Japanese patent application published before examination under publication number 56-115818. In the air suction device thus proposed, a surge chamber which is separated off by a partition-wall into two compartments for air expansion is provided in an inlet passage together with a first group of connecting air passages each coupling a corresponding one of a first group of cylinders operative to work with their respective suction strokes which are not successive to one another with one of the compartments and a second group of connecting air passages each coupling a corresponding one of a second group of cylinders operative to work with their respective suction strokes which are not successive to one another with the other of the compartments. The partition-wall in the surge chamber is provided with an opening for connecting the separated compartments with each other and a closing valve for shutting selectively the opening.

With this configuration, the closing valve is controlled in response to the operating condition of the engine, for example, so as to be closed when the engine speed is lower than a predetermined value and opened when the engine speed is equal to or higher than the predetermined value. As a result of such a control of the closing valve, it can be arranged that the opening operation of each inlet valve disposed in the inlet passage is performed in synchronism with the period of intake pressure vibration arising in the inlet passage at both the engine speed lower than the predetermined value and the engine speed higher than the predetermined value. In such a case, resonance supercharging is effected in a wide speed range of the engine and thereby air is effectively charged into the respective cylinders, so that air charge efficiency in each of the cylinders is increased.

In such an improved air suction device proposed previously, however, there are problems that installation of the closing valve at a portion of the partition-wall where the opening is provided in the surge chamber requires a relatively complicated construction for securing the closing valve on the partition-wall and requires also annoying handwork for mounting the closing valve on the partition-wall. Moreover, the surge chamber is apt to be increased in size for reducing difficulties in mounting the closing valve on the partition-wall therein, and this may result in a further problem that the whole device is increased in size.

Further, in the case where the opening provided on the partition-wall and the closing valve installed on the partition-wall for shutting the opening selectively are located at respective inappropriate positions in the surge chamber, intake air flowing through the inlet passage is impeded by the closing valve to be supplied smoothly to the cylinders and therefore the air charge efficiency in each cylinder is not improved. To avoid such a case, both the opening and the closing valve on the partition-wall must be precisely disposed at respective proper positions in the surge chamnber.

OBJECTS AND SUMMARY OF THE INVENTION

Accordingly, it is an object of the present invention to provide an air suction device for a multicylinder engine which avoids the aforementioned problems encountered with the prior art.

Another object of the present invention is to provide an air suction device for a multicylinder engine, in which a surge chamber is provided in an inlet passage and separated off into first and second compartments for air expansion by a partition-wall member which is provided with a connecting passage for interconnecting the first and second compartments and a closing valve for shutting selectively the connecting passage in response to the operating condition of the engine, so that resonance supercharging is effected to cylinders in a wide speed range of the engine and thereby air charge efficiency in each cylinder is improved, and the connecting passage and the closing valve can be easily installed on the partition-wall member with simple construction without being increased in size in its entirety.

A further object of the present invention is to provide an air suction device for a multicylinder engine, in which a surge chamber is provided in an inlet passage and separated off into first and second compartments for air expansion by a partition-wall member which is provided with a connecting passage for interconnecting the first and second compartments and a closing valve for shutting selectively the connecting passage in response to the operating condition of the engine, so that resonance supercharging is effected to cylinders in a wide speed range of the engine and thereby air charge efficiency in each cylinder is improved, and the connecting passage and the closing valve can be easily installed on the partition-wall member in such a manner that the closing valve is prevented from augmenting resistance against intake air flowing through the surge chamber without being increased in size in its entirety.

A still further object of the present invention is to provide an air suction device for a multicylinder engine, in which a surge chamber is provided in an inlet passage and separated off into first and second compartments for air expansion by a partition-wall member which is provided with a connecting passage for interconnecting the first and second compartments and a closing valve for shutting selectively the connecting passage in response to the operating condition of the engine, so that resonance supercharging is effected to cylinders in a wide speed range of the engine and thereby air charge efficiency in each cylinder is improved, and the connecting passage and the closing valve can be easily installed on the partition-wall member to be located precisely at respective proper positions in the surge chamber without being increased in size in its entirety.

In accordance with the present invention, there is provided an air suction device for a multicylinder engine, which comprises a first group of partial inlet passages each having one end connected to a corresponding one of a first group of cylinders operative to work with their respective suction strokes which are not successive to one another, a second group of partial inlet passages each having one end connected to a corresponding one of a second group of cylinders operative to work with their respective suction strokes which are not successive to one another, a surge chamber separated off by a partition-wall member, which is provided with a cutout portion thereon, into a first compartment for air expansion provided with a plurality of openings each coupled with the other end of one of the first group of partial inlet passages and a second compartment for air expansion provided with a plurality of openings each coupled with the other end of one of the second group of partial inlet passages, and a valve unit including a body member forming an air passage and a closing valve disposed in the body member for closing selectively the air passage and being fitted to the cutout portion provided on the partition-wall member in the surge chamber so as to form with the air passage thereof a connecting passage provided for interconnecting the first and second compartments and closed selectively by the closing valve.

In the air suction device thus constituted in accordance with the present invention, intake air is guided through the first compartment in the surge chamber and the first group of partial inlet passages to the first group of cylinders and also guided through the second compartment in the surge chamber and the second group of partial inlet passages to the second group of cylinders. Under such a condition, the closing valve provided in the connecting passage for interconnecting the first and second compartments is closed to shut the connecting passage when the engine speed is in a relatively low range and opened to cause the connecting passage to be opened when the engine speed is in a relatively high range. As a result of this, the opening operation of each of inlet valves disposed in the first and second groups of cylinders, respectively, is performed in synchronism with the period of intake pressure vibration arising in the first and second partial inlet passages and the surge chamber at both the engine speed in the relatively low range and the engine speed in the relatively high range, and consequently, resonance supercharging is effected in a wide range of the engine speed and thereby air is effectively charged into the respective cylinders, so that air charge efficiency in each of the cylinders is increased and the output torque characteristic o the engine is improved.

In addition, the connecting passage provided on the partition-wall member for interconnecting the first and second compartments and the closing valve provided on the partition-wall member for closing selectively the connecting passage are formed by the valve unit, which includes the body member forming the air passage and the closing valve provided in the body member, fitted to the cutout portion provided on the partition-wall member, and this means that the connecting passage and the closing valve are easily installed on the partition-wall member in the surge chamber without causing the device to be increased in size. Further, since the valve unit is fitted to the cutout portion previously provided on the partition-wall member and therefore the connecting passage and the closing valve are located precisely at their respective proper positions in the surge chamber, the closing valve is prevented from augmenting resistance against intake air flowing through the surge chamber to the first and second groups of cylinders.

The above, and other objects, features and advantages of the present invention will become apparent from the following detailed description which is to be red in conjunction with the accompanying drawings.

DESCRIPTION OF THE PREFERRED EMBODIMENTS

Now, embodiments of air suction device for a multicylinder engine according to the present invention will be described with reference to the accompanying drawings.

Figure 1:
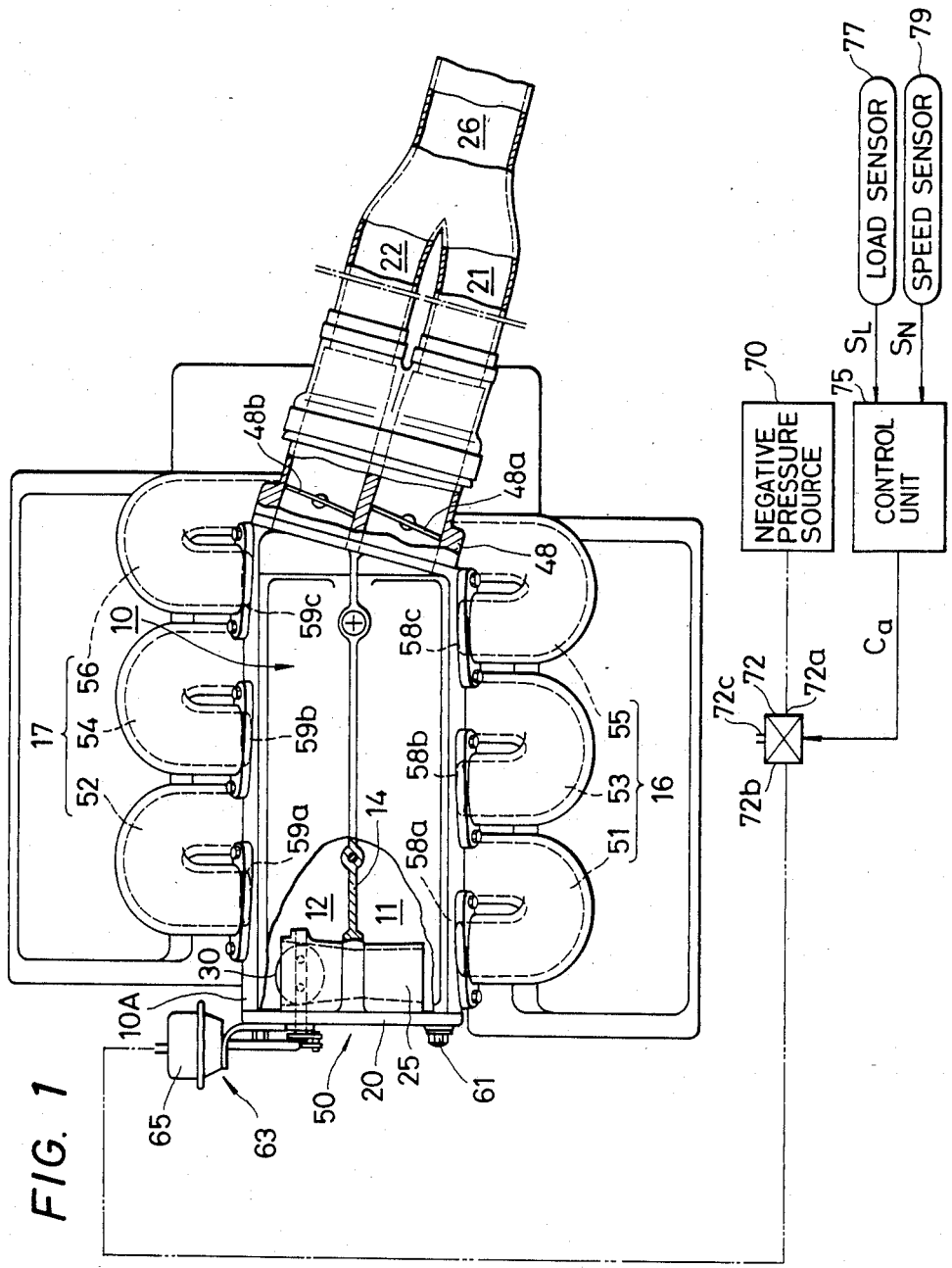
FIG. 1 is a schematic plan view showing an embodiment of air suction device for a multicylinder engine according to the present invention.
Figure 2:
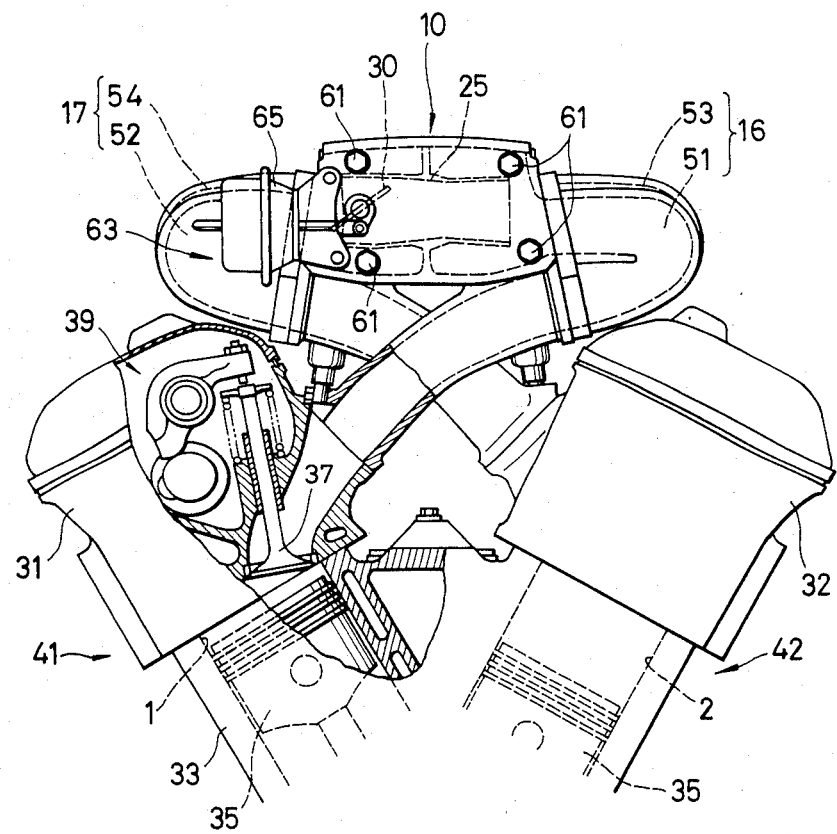
FIG. 2 is a schematic side view showing an essential part of a multicylinder engine to which the embodiment shown in FIG. 1 is employed.

FIG. 1 shows an example of the air suction device for a multicylinder engine according to the present invention and FIG. 2 shows an essential part of a multicylinder engine in which the example shown in FIG. 1 is employed.

The engine in which the example shown in FIG. 1 is employed is a V type engine with six cylinders and has an engine block forming a couple of cylinder banks 41 and 42 which are composed of a cylinder block 33 and a pair of cylinder heads 31 and 32 disposed on the cylinder block 33 so as to be arranged in the V shape, as shown in FIG. 2. In the cylinder bank 41 to which the cylinder head 31 belongs, a first cylinder 1 and third and fifth cylinders constituting a first group of cylinders operative to work with their respective suction strokes which are not successive to one another are contained (the third and fifth cylinders do not appear in the figures), and in the cylinder bank 42 to which the cylinder head 32 belongs, a second cylinder 2 and fourth and sixth cylinders constituting a second group of cylinders operative to work with their respective suction strokes which are not successive to one another are contained (the fourth and sixth cylinders do not appear in the figures). The first to sixth cylinders are arranged successively from the front end to the rear end of the engine, and in each of these cylinders, a piston 35, an inlet valve 37 and an exhaust valve (not shown in the figures) are provided. The inlet valve 35 and the exhaust valve are driven to be opened and closed by an ordinary valve operating mechanism 39 so that the first to sixth cylinders take their respective suction strokes in such an order as the first cylinder 1→the second cylinder 2→the third cylinder→the six cylinder→the fifth cylinder→the fourth cylinder.

Inlet manifolds 51, 53 and 55 which constitute a first group of partial inlet passages 16 are connected at their respective downstream ends to the first, third and fifth cylinders, respectively, and inlet manifolds 52, 54 and 56 which constitute a second group of partial inlet passages 17 are connected at their respective downstream ends to the second, fourth and sixth cylinders, respectively. Each of the inlet manifolds 51 to 56 is also connected at its upstream end to a surge chamber 10 and has an upper portion extending from the upstream end to be bent into the U-shape.

The surge chamber 10 is separated off by a partition-wall 14 provided therein into two compartments 11 and 12 for air expansion. The compartment 11 is provided with three openings 58a, 58b and 58c with which the upstream ends of the inlet manifolds 51, 53 and 55 are coupled, respectively, and the compartment 12 is also provided with three openings 59a, 59b and 59c with which the upstream ends of the inlet manifolds 52, 54 and 56 are coupled, respectively. The openings 58a, 58b and 58c are arranged successively between the front and rear end portions of the surge chamber 10 at regularly spaced intervals without being partial to one side in its entirety, while the openings 59a, 59b and 59c are arranged successively between the front and rear end portions of the surge chamber 10 at regularly spaced intervals and onesided in its entirety so as to close to the rear end portion of the surge chamber 10, as shown in FIG. 1. Accordingly, the opening 58a which is nearest to the front end portion of the surge chamber 10 on the compartment 11 is more close to the front end portion of the surge chamber 10 than the opening 59a which is nearest to the front end portion of the surge chamber 10 on the compartment 12, so that a certain space in the surge chamber 10 is formed between the front end portion in the surge chamber 10 and the opening 59a on the compartment 12.

A throttle valve body 48 constituting downstream end portions of branched inlet passages 21 and 22 is connected to the rear end portion of the surge chamber 10 and provided therein with throttle valves 48a and 48b each of which is selectively opened in response to the operating condition of the engine. The branched inlet passages 21 and 22 are merged at their respective upstream end portions in a common inlet passage 26, and the downstream end portions of the branched inlet passages 21 and 22 are coupled with the compartments 11 and 12 in the surge chamber 10, respectively.

In the surge chamber 10, a connecting air duct 25 is mounted on the partition-wall 14 to pass through the same for interconnecting the compartments 11 and 12 and a closing valve 30 is provided in the connecting air duct 25 at one end thereof located in the compartment 12 for selectively closing the interconnecting passage between the compartments 11 and 12. The connecting air duct 25 is so selected in its dimensions that the length is larger than the diameter, and incorporated with a side wall 20 forming the front end of a housing of the surge chamber 10 by means of, for example, die casting.

A housing end portion 50 which is composed of the side wall 20 and the connecting air duct 25 provided therein with the closing valve 30 at one end thereof is mounted to be detachable by four bolts 61 to a housing body 10A which is provided with a cutout at a portion of side walls thereof (at the location where the side wall 20 is to be positioned) and also with another cutout at one end portion of the partition-wall 14 in the surge chamber 10, with which the connecting air duct 25 is engaged.

Figure 3:
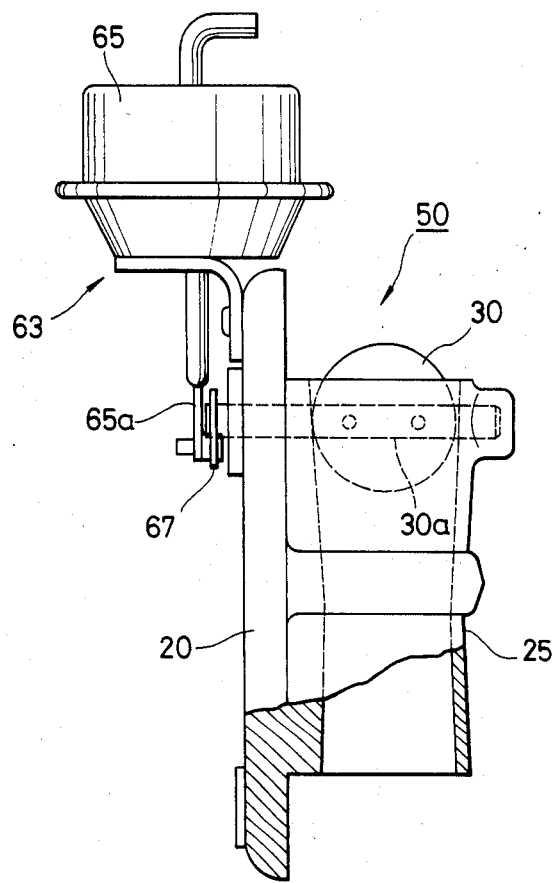
FIG. 3 is a schematic side view showing a portion of the embodiment shown in FIG. 1.

The housing end portion 50 is accompanied with a valve operating device 63 for driving the closing valve 30 provided at one end of the connecting air duct 25, as shown in FIG. 3. The valve operating device 63 includes a diaphragm block 65 and a link member 67 for rotating a shaft 30a of the closing valve 30. The closing valve 30 is moved through the link member 67 to open the connecting air duct 25 when the diaphragm block 65 pulls in a diaphragm rod 65a and closed through the link member 67 to shut the connecting air duct 25 when the diaphragm block 65 pushes out the diaphragm rod 65a. When the connecting air duct 25 is opened, the compartments 11 and 12 in the surge chamber 10 are interconnected through the connecting air duct 25 so as to form a single room, and when the connecting air duct 25 is shut, the compartment 12 and the compartment 11 incorporated with the connecting air duct 25 form respective individual spaces of the same effective capacity.

As shown in FIG. 1, a depression from a negative pressure source 70 is selectively supplied to the diaphragm block 65 through a three way type solenoid valve 72, so that the diaphragm rod 65a is pulled in when the depression is supplied to the diaphragm block 65 and pushed out when the diaphragm block 65 is not supplied with the depression but released to atmosphere. The three way type solenoid valve 72 is operative to interconnect a depression introducing port 72a connected to the negative pressure source 70 and a supplying port 72b connected to the diaphragm block 65 when a control signal Ca from a control unit 75 is supplied thereto and to interconnect an atmosphere introducing port 72c released to atmosphere and the supplying port 72b when the control signal from the control unit 75 is not supplied thereto. The control unit 75 generates the control signal Ca based on both of a detection output signal $S_L$ obtained from a load sensor 77 for detecting engine load and a detection output singal $S_N$ obtained from a speed sensor 79 for detecting engine speed and supplies the same to the three way type solenoid valve 72.

In the embodiment thus constituted, when the engine is started to operate, the intake air is introduced through the common inlet passage 26, branched intake passages 21 and 22, surge chamber 10, and first and second groups of partial inlet passages 16 and 17 to each of the first to sixth cylinders. The control unit 75 does not supply the control signal Ca to the three way type solenoid valve 72 when the engine load represented by the detection output signal $S_L$ is equal to or larger than a predetermined load value and the engine speed represented by the detection output signal $S_N$ is equal to or lower than a predetermined speed value, and supplies the control signal Ca to the three way type solenoid valve 72 when the engine load represented by the detection output signal $S_L$ is smaller than the predetermined load value or the engine speed represented by the detecting output signal $S_N$ is higher than the predetermined speed value. As a result, the closing valve 30 is closed only when the engine load is equal to or larger than the predetermined load value and the engine speed is equal to or lower than the predetermined speed value, and opened in other conditions.

Accordingly, in the case of the engine load smaller than the predetermined load value, the closing valve 30 is opened so that the compartments 11 and 12 in the surge chamber 10 are interconnected through the connecting air duct 25 to form the single room. In this condition, although the resonance supercharging is not effected in suction stroke of each of the first to sixth cylinders, air distribution to the first to sixth cylinders is improved and consequently variations in output torque of the engine are diminished. On the other hand, in the case of the engine load equal to or larger than the predetermined load value, the closing valve 30 is closed so that the compartment 12 and the compartment 12 incorporated with the connecting air duct 25 form the respective individual spaces of almost the same effective capacity when the engine speed is equal to or lower than the predetermined speed value. As a result of this, in both of a low engine speed condition in which the engine operates at the speed equal to or lower than the predetermined speed value and a high engine speed condition in which the engine operates at the speed higher than the predetermined speed value, the opening operation of each of the inlet valves 37 disposed in the first and sixth cylinders, respectively, is performed in synchronism with the period of intake pressure vibration arising in the first and second groups of partial inlet passages 16 and 17 and the surge chamber 10, and consequently the resonance supercharging is effected in suction stroke of each of the first to sixth cylinders, so that air charge efficiency in each of the first and sixth cylinders is increased and the output torque characteristic of the engine is improved.

Further, in the embodiment described above, since the connecting air duct 25 is disposed at the inside of the front end portion of the surge chamber 10 and therefore the intake air introduced into the surge chamber 10 through the branched inlet passages 21 and 22 can be guided smoothly to the first and second groups of partial inlet passages 16 and 17 without being impeded by the connecting air duct 25, increment of resistance against the intake air flowing through the surge chamber 10 caused by the connecting air duct 25 is restricted to be so small compared with a case in which the connecting air duct 25 is disposed in the surge chamber 10 at a location other than the front end portion of the surge chamber 10. In addition, since the closing valve 30 is provided at the end portion of the connecting air duct 25 located in the compartment 12 and the connecting air duct 25 is disposed in the space formed between the front end portion in the surge chamber 10 and the opening 59a on the compartment 12, the closing valve 30 is located at a position relatively remote from each of the openings $58a \sim 58c$ and $59a \sim 59c$ and therefore increment of resistance against the intake air flowing through the surge chamber 10 caused by the closing valve 30 is also restricted to be extremely small.

Moreover, since the connecting air duct 25 provided at its one end portion with the closing valve 30 is incorporated with the side wall 20 forming the front end portion of the surge chamber 10 to constitute the housing end portion 50 which is attached to be detachable to the housing body 10A of the surge chamber 10 and the valve operating device 63 is fixed to the housing end portion 50, the connecting air duct 25 and the closing valve 30 accompanied with the valve operating device 63 can be easily installed on the partition-wall 14 in the surge chamber 10 with simple construction without causing the surge chamber 10 to be increased in size. Besides, it is possible to change easily the output torque characteristic of the engine without having reconstruction in large scale by means of attaching, instead of the housing end portion 50, another housing end portion provided with a connecting air duct of different dimensions to the housing body 10A.

Figure 4:
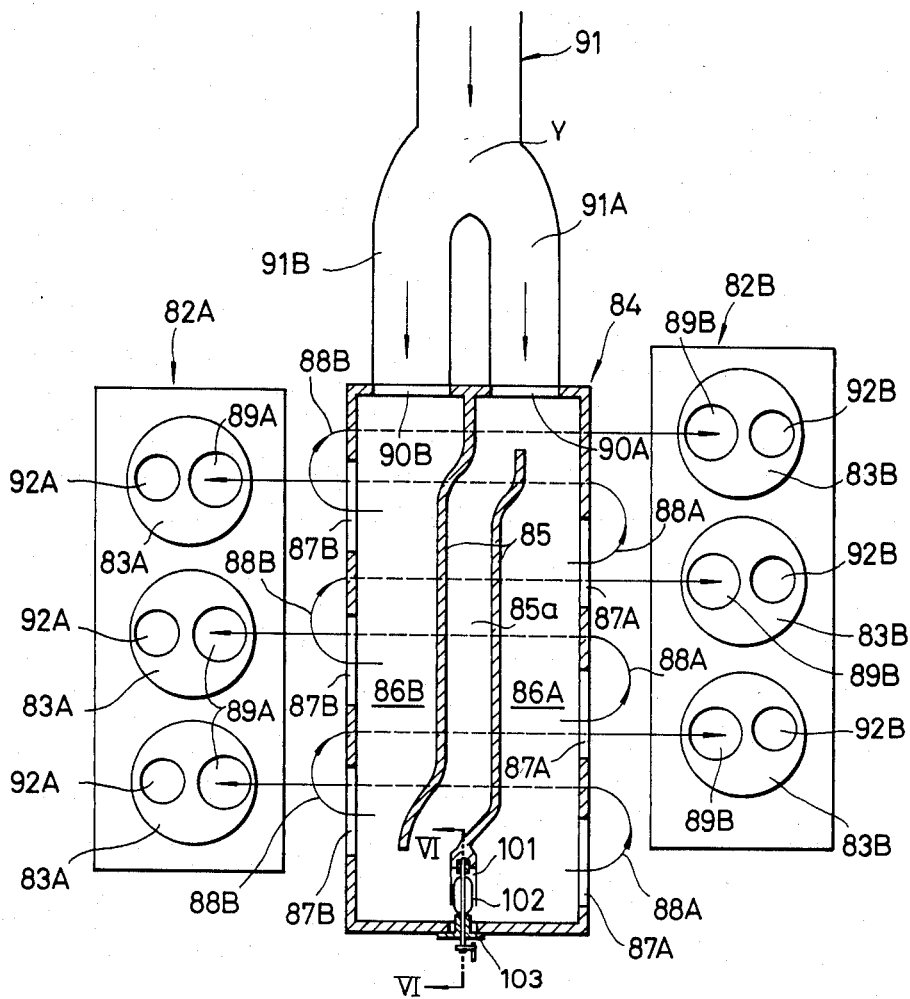
FIG. 4 is a schematic plan view showing another embodiment of air suction device for a multicylinder engine according to the present invention.
Figure 5:
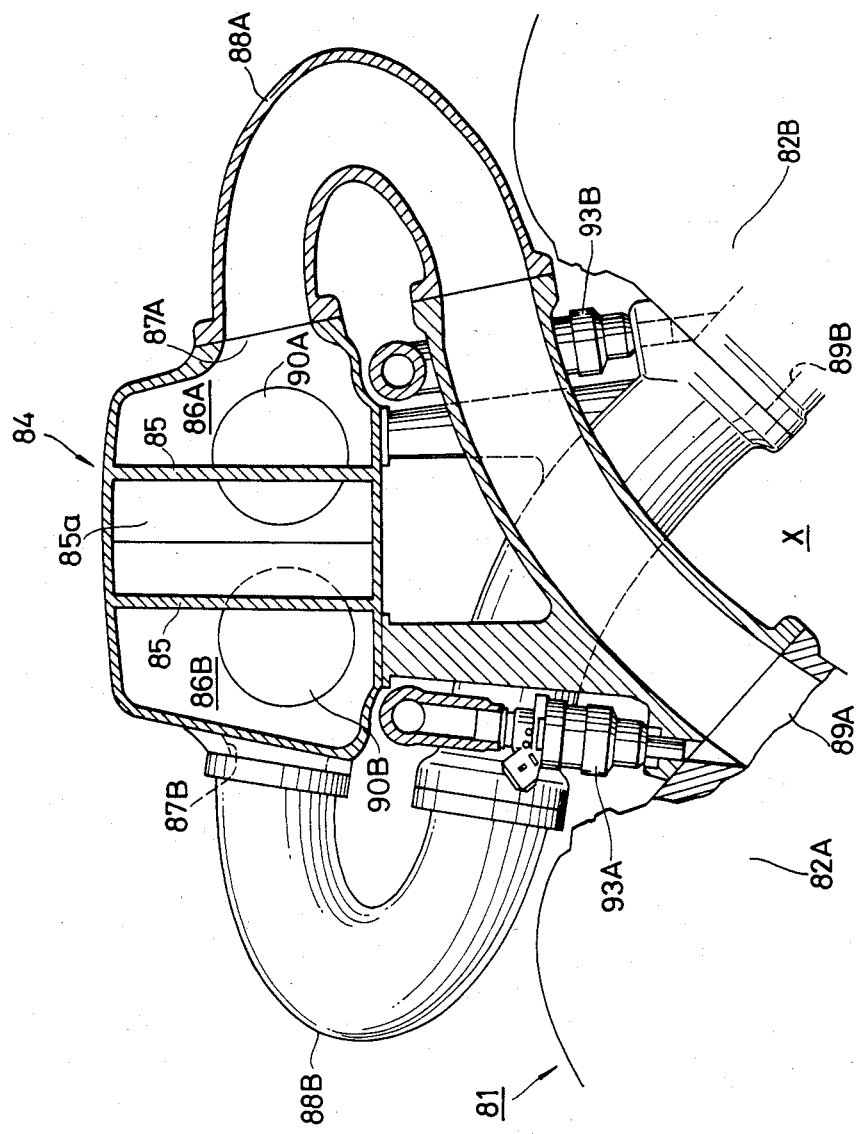
FIG. 5 is a schematic side view showing an essential part of another multicylinder engine to which the embodiment shown in FIG. 4 is employed.

FIG. 4 shows another example of the air suction revice for a multicylinder engine according to the present invention and FIG. 5 shows an essential part of a multicylinder engine in which the example shown in FIG. 4 is employed.

In FIG. 5, the example shown in FIG. 4 is employed in an engine 81 which is of the V type with six cylinders and has a couple of cylinder banks 82A and 82B disposed in the V shape. In the cylinder bank 82A, first, third and fifth cylinders 83A constituting a first group of cylinders operative to work with their respective suction strokes which are not successive to one another are contained, and in the cylinder bank 82B, second, fourth and sixth cylinders 83B constituting a second group of cylinders operative to work with their respective suction strokes which are not successive to one another are contained, as shown in FIG. 1. The first, third and fifth cylinders 83A and second, fourth and sixth cylinders 83B are arranged alternately in the direction along an output shaft of the engine 81 from the front end to the rear end of the engine 81, and take their respective suction strokes in such an order as the first cylinder 83A →the second cylinder 83B→the third cylinder 83A→the six cylinder 83B→the fifth cylinder 83A→the fourth cylinder 83B.

There is provided a surge chamber 84 above a central space X formed between the cylinder banks 82A and 82B. The surge chamber 84 elongates in the direction along the output shaft of the engine 81 and is separated off into first and second compartments 86A and 86B for air expansion by a pair of parallel partition-walls 85 provided therein to elongate in the direction along the output shaft of the engine 81. A connecting path 85a is formed between the partition-walls 85 to interconnect therethrough the first and second compartments 86A and 86B. The length of the connecting path 85a is selected so as to satisfy the condition for causing the opening operation of each of inlet valves provided for the first to sixth cylinders 83A and 83B to be performed in synchronism with the period of intake pressure vibration arising in the surge chamber 84 in a relatively low speed range of the engine 81.

The first compartment 86A is provided with three air outlets 87A formed on one of the side walls of the surge chamber 84 and the second compartment 86B is also provided with three air outlets 87B formed on the other of the side walls of the surge chamber 84. The air outlets 87A opening at the first compartment 86A are connected through inlet manifolds 88A, which constitute a first group of partial inlet passages, to inlet ports 89A of the first, third and fifth cylinders 83A in the cylinder bank 82A, respectively. Similarly, the air outlets 87B opening at the second compartment 86B are connected through inlet manifolds 88B, which constitute a second group of partial inlet passages, to inlet ports 89B of the second, fourth and sixth cylinders 83B in the cylinder bank 82B, respectively. Each of the inlet manifolds 88A and 88B extends downward from the surge chamber 84 to the cylinder bank 82A or 82B to be bent into the U-shape so that resonance supercharging is able to be effected in each of the first to sixth cylinders 83A and 83B.

At a rear wall portion of the surge chamber 84, first and second air inlets 90A and 90B are provided on the first and second compartments 86A and 86B, respectively, and downstream ends of branched inlet passages 91A and 91B are connected respectively to the first and second air inlets 90A and 90B. The branched inlet passages 91A and 91B are merged at their respective upstream end portions in a common inlet passage 91. Each of the overall length including the branched inlet passage 1A and the first compartment 86A in the surge chamber 84 and the overall length including the branched inlet passage 91B and the second compartment 86B in the surge chamber 84 is selected to be greater than the length of the connecting path 85a formed in the surge chamber 84.

With such a configuration, intake air flowing through the common inlet passage 91 is divided at a fork Y into two separate air flows, one of which is introduced through the branched inlet passage 91A into the first compartment 86A and the other of which is introduced through the branched inlet passage 91B into the second compartment 86B. The air flow introduced into the first compartment 86A is fed through the inlet manifolds 88A to the first, third and fifth cylinders 83A in the cylinder bank 82A, while the air flow introduced into the second compartment 86B is fed through the inlet manifolds 88B to the second, fourth and sixth cylinders 83B in the cylinder bank 82B.

Each of the first, third and fifth cylinders 83A is provided with an exhaust port 92A, and similarly, each of the second, fourth and sixth cylinders 83B is provided with an exhaust port 92B, as shown in FIG. 4. Further, as shown in FIG. 5, a fuel injector 93A is set for each of the first, third and fifth cylinders 83A, and a fuel injector 93B is set for each of the second, fourth and sixth cylinders 83B.

The partition-wall 85 in the surge chamber 84 is provided with a connecting opening 101 at an end portion thereof close to a front wall portion of the surge chamber 84. The connecting opening 101 is selectively closed by a closing valve 102 which is engaged to be movable with the connecting opening 101. With this connecting opening 101, the first and second compartments 86A and 86B can be interconnected through a passage extremely shorter than the connecting path 85a.

In the embodiment shown in FIGS. 4 and 5 thus constituted, when the closing valve 102 is closed, the first and second compartments 86A and 86B are interconnected through a long connecting passage formed by the connecting path 85a, and as a result, the condition for causing the opening operation of the inlet valve in each of the first to sixth cylinders 83A and 83B to be performed in synchronism with the period of intake pressure vibration arising in the inlet manifolds 88A and 88B and the surge chamber 84 in a low speed range of the engine 81, is satisfied. On the other hand, when the closing valve 102 is opened, the first and second compartments 86A and 86B are interconnected substantially through a short connecting passage formed by the connecting opening 101, and as a result, the condition for causing the opening operation of the inlet valve in each of the first to sixth cylinders 83A and 83B to be performed in synchronism with the period of intake pressure vibration arising in the inlet manifolds 88A and 88B and the surge chamber 84 in a high speed range of the engine 81, is satisfied.

Figure 6:
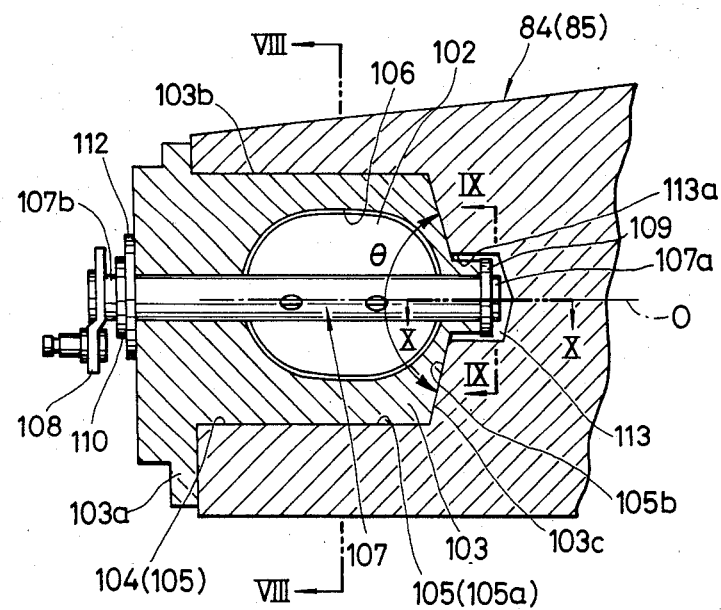
FIG. 6 is a schematic cross-sectional view taken on line VI—VI of FIG. 4.
Figure 7:
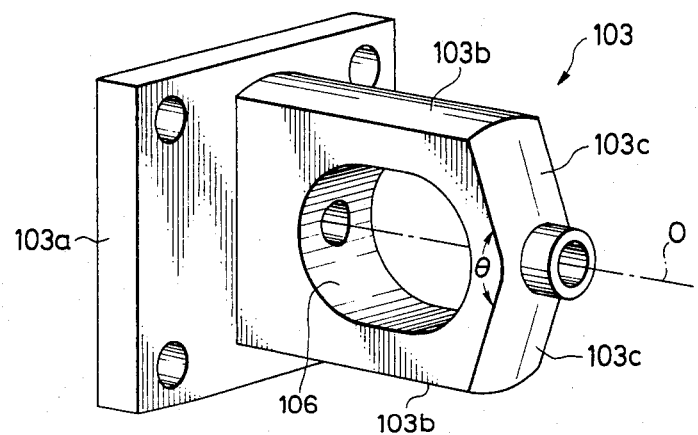
FIG. 7 is a schematic perspective view showing a portion of the embodiment shown in FIG. 4.

As shown in FIG. 6, the closing valve 102 has a rotating shaft 107 and is supported to be rotatable by a valve housing 103 which is provided with an opening 106 wherein the closing valve 102 is placed and a flange portion 103a, as shown in FIG. 7. The valve housing 103 is engaged with a cutout 105 provided on the partition-wall 85 in the surge chamber 84 through an opening 104 provided on the front wall portion of the surge chamber 84 in such a manner that the opening 106 accompanied with the closing valve 102 is positioned so as to form the connecting opening 101 and fixed to the surge chamber 84 with a plurality of bolts (not shown in the figures) passing through the flange portion 103a.

Figure 8:
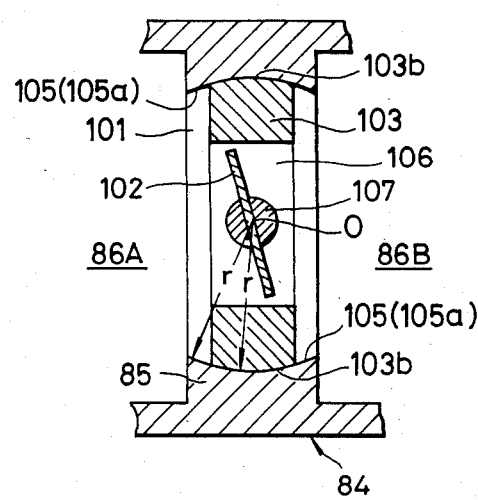
FIG. 8 is a schematic cross-sectional view taken on line VIII—VIII of FIG. 6.
Figure 10:
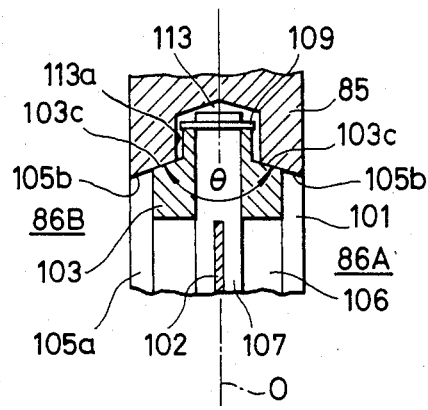
FIG. 10 is a schematic cross-sectional view taken on line X—X of FIG. 6.

The cutout 105 on the partition-wall 85 and the opening 104 on the front wall portion of the surge chamber 84 are formed in the same process by means of drilling with a drill having a relatively large radial. r. Accordingly, an inner surface of the cutout 105 forms portions of a cylindrical inner surface 105a surrounding a center axis O of the drill with a radial . r and portions of a conical inner surface 105b with an apex angle. $\theta$ corresponding to a tip portion of the drill, as shown in FIG. 8. An outer surface of the valve housing 103 forms portions of a cylindrical outer surface 103b surrounding the center axis O with a radial . r and portions of a conical outer surface 103c with an apex angle. $\theta$, so as to come in contact with the inner surface of the cutout 105 when the valve housing 103 is engaged with the cutout 105, as shown in FIGS. 6 and 10.

Figure 11:
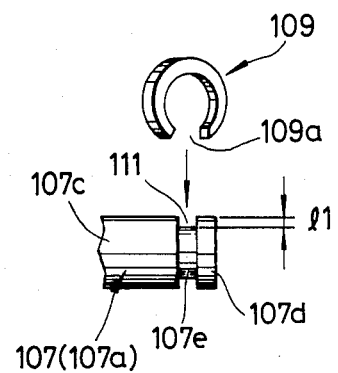
FIG. 11 is a schematic exploded perspective view showing a part of the embodiment shown in FIG. 4.

The rotating shaft 107 of the closing valve 102 is positioned along the center axis O with one end portion 107a inserted in the cutout 105 and the other end portion 107b projecting out of the surge chamber 84 to be provided with a link 108 which is to be connected to an actuator for driving the closing valve 102. C-shaped stoppers 109 and 110 are attached to the end portions 107a and 107b of the rotating shaft 107, respectively. As shown in FIG. 11, at the end portion 107a of the rotating shaft 107, a ring groove 111 is formed to provide a portion 107e of smaller diameter between portions 107c and 107d of larger diameter arranged in the direction along which the rotating shaft 107 elongates. The C-shaped stopper 109 is made of resilient material and engaged with the portion 107e of smaller diameter. An outer peripheral portion of the C-shaped stopper 109 engaged with the end portion 107a of the rotating shaft 107 projects outward from the rotating shaft 107 and is operative to come into contact with one end of the valve housing 103 so that the rotating shaft 107 is prevented from being shifted excessively in the direction toward the end portion 107b thereof. The C-shaped stopper 110 is also made of resilient marterial and engaged with the end portion 107b of the rotating shaft 107 in the same manner as the C-shaped stopper 109 so as to prevent the rotating shaft 107 from being shifted excessively in the direction toward the end portion 107a of the same. The end portion 107b is also provided with a washer 112 at the outside of the surge chamber 84. With such C-shaped stoppers 109 and 110, the rotating shaft 107 is limited to move in the longitudinal direction and supported to be rotatable by the valve housing 103.

The end portion 107a accompanied with the C-shaped stopper 109 projects slightly from the portions of the conical outer surface 103c of the valve housing 103. This projecting end portion 107a is placed at an innermost recess 113 in the cutout 105. The innermost recess 113 is walled up by the portions of the conical outer surface 103c of the valve housing 103 when the projecting end portion 107a is placed therein. Accordingly, even if the C-shaped stopper 109 is detached from the end portion 107a of the rotating shaft 107, it is surely maintained in the innermost recess 113 without dropping in the first or second compartment 86A or 86B in the surge chamber 84.

Figure 9:
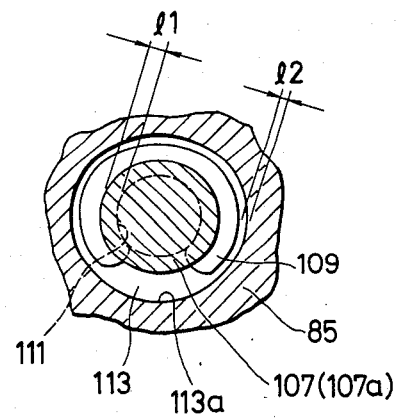
FIG. 9 is a schematic cross-sectional view taken on line IX—IX of FIG. 6.

In this embodiment, the C-shaped stopper 109 is prevented from disjoining from the end portion 107a of the rotating shaft 107 by a cylindrical portion 113a of the innermost recess 113 in the cutout 105. As shown in FIG. 9, although the inside diameter of the cylindrical portion 113a of the innermost recess 113 is larger slightly than the diameter of the C-shaped stopper 109, a gap l2 between the cylindrical portion 113a and the C-shaped stopper 109 is selected to be considerably smaller than the depth l1 of the groove 111 provided on the rotating shaft 107. As a result of this, the movement of the C-shaped stopper 109 in the radial direction is restricted to a distance smaller than the depth l1 of the groove 111 by the cylindrical portion 113a of the innermost recess 113, so that the C-shaped stopper 109 is prevented surely from being detached from the rotating shaft 107.

In installing the closing valve 102 in the surge chamber 84, the closing valve 102 is previously mounted on the valve housing 103 with the C-shaped stoppers 109 and 110, and then the valve housing 103 provided with the closing valve 102 is engaged with the cutout 105 on the partition-wall 85 and fixed to the surge chamber 84. Accordingly, the closing valve 102 is easily installed in an appropriate manner on the partition-wall 85 in the surge chamber 84. Moreover, in such an installation, the portion of the valve housing 103 located in the surge chamber 84 is tightly held by the inner surface of the cutout 105 on the partition-wall 85 and therefore the closing valve 102 is surely and firmly located at a proper position in the surge chamber 84.

Further, since the curved outer surface of the portion of the valve housing 103 located in the surge chamber 84 comes into contact tightly with the corresponding curved inner surface of the cutout 105 on the partition-wall 85, each of the first and second compartments 86A and 86B is securely sealed up at the cutout 105.

Although the connecting path 85a is formed in the surge chamber 84 in the above mentioned embodiment, it is possible to eliminate the connecting path 85a and arrange the branched inlet passages 91A and 91B to serve as a connecting passage interconnecting the first and second compartments 86A and 86B for the resonance supercharging in a low speed range of the engine.

Besides, the valve housing 103 can be easily moulded from plastics, light metals or the like.

What is claimed is:

1. An air suction device for a multicylinder engine comprising:
    a first group of inlet passages each having one end connected to one of a first group of cylinders operative to work with their respective suction strokes which are not successive to one another,
    a second group of inlet passages each having one end connected to one of a second group of cylinders operative to work with their respective suction strokes which are not successive to one another,
    a surge chamber separated off by a partition-wall member into a first compartment for air expansion provided with a plurality of first openings each coupled with the other end of one of said first group of inlet passages and a second compartment for air expansion provided with a plurality of second openings each coupled with the other end of one of said second group of inlet passages, said partition-wall member being provided with a cutout portion thereon, and
    a valve unit including a body member forming an air passage and a closing valve disposed in the body member for closing selectively the air passage, said valve unit being fitted to said cutout portion provided on the partition-wall member in said surge chamber so as to form with said air passage thereof a connecting passage provided for interconnecting said first and second compartments and closed selectively by said closing valve, and wherein the surge chamber is constituted with a rear wall portion provided thereon with air inlets, a front wall portion opposite to the rear wall portion, a first side wall portion on which the first openings are formed, and a second side wall on which the second openings are formed, and wherein the front wall portion is provided with an opening continuing to the cutout portion provided on the partition-wall member, and wherein the body member of the valve unit comprises a flange portion fixed to the front wall portion of the surge chamber and a valve housing engaging with the cutout portion provided on the partition-wall member, and wherein the cutout provided on the partition-wall member is formed at a portion of the partition-wall member close to the front wall portion of the surge chamber, and wherein the closing valve has a rotating shaft with one end thereof projecting outward from the flange portion of the body member.

2. An air suction device according to claim 1, wherein said rotating shaft extends along a plane including said portion of the partition-wall member at which said cutout is formed.

3. An air suction device according to claim 2, wherein said valve housing is provided with said air passage in which said closing valve is disposed with said rotating shaft supported to be rotated by said valve housing.

4. An air suction device according to claim 3, wherein said cutout portion is formed with a drilled opening provided with portions each having a curved inner surface and said valve housing is shaped to be provided with portions each having a curved outer surface for coming into contact with said curved inner surface of the drilled opening.

5. An air suction device according to claim 4, wherein the outer surface of said valve housing forms portions of a cylindrical outer surface surrounding a center axis of the valve housing along which said rotating shaft extends and portion of a conical outer surface surrounding said center axis.

6. An air suction device according to claim 5, wherein the other end of said rotating shaft is provided with a ring groove with which a C-shaped stopper is engaged.

7. An air suction device according to claim 6, wherein said other end of the rotating shaft is placed at an innermost recess in the cutout portion provided on the partition-wall member to be supported thereby.

8. An air suction device according to claim 7, wherein said innermost recess has a cylindrical portion with a diameter larger than a diameter of the C-shaped stopper so that a gap formed between the cylindrical portion and the C-shaped stopper is selected to be smaller than the depth of the ring groove provided on said rotating shaft.

9. An air suction device for a multicylinder engine comprising:
a first group of inlet passages each having one end connected to one of a first group of cylinders operative to work with their respective suction strokes which are not successive to one another,
a second group of inlet passages each having one end connected to one of a second group of cylinders operative to work with their respective suction strokes which are not successive to one another,
a surge chamber separated off by a partition-wall member into a first compartment for air expansion provided with a plurality of first openings each coupled with the other end of one of said first group of inlet passages and a second compartment for air expansion provided with a plurality of second openings each coupled with the other end of one of said second group of inlet passages, said partition-wall member being provided with a cutout portion thereon, and
a valve unit including a body member forming an air passage and a closing valve disposed in the body member for closing selectively the air passage, said valve unit being fitted to said cutout portion provided on the partition-wall member in said surge chamber so as to form with said air passage thereof a connecting passage provided for interconnecting said first and second compartments and closed selectively by said closing valve, and wherein the surge chamber is constituted with a rear wall portion provided thereon with air inlets, a front wall portion opposite to the rear wall portion, a first side wall portion on which the first openings are formed, and a second side wall on which the second openings are formed, and wherein the front wall portion is provided with an opening continuing to the cutout portion is provided on the partition-wall member, and wherein the body member of the valve unit comprises a flange portion fixed to the front wall portion of the surge chamber and a valve housing engaging with the cutout portion provided on the partition-wall member, and wherein the cutout provided on the partition-wall member is formed at a portion of the partition-wall member close to the front wall portion of the surge chamber, and wherein the closing valve has a rotating shaft with one end thereof projecting outward from the flange portion of the body member, and wherein the surge chamber is provided with an additional connecting passage extending along the partitionwall member for interconnecting the first and second compartment, and the valve unit is disposed at a location between one end of the additional connecting passage and the front wall portion of the surge chamber.

10. An air suction device for a multicylinder engine comprising:
a first group of inlet passages each having one end connected to one of a first group of cylinders operative to work with their respective suction strokes which are not successive to one another,
a second group of inlet passages each having one end connected to one of a second group of cylinders operative to work with their respective suction strokes which are not successive to one another,
a surge chamber separated off by a partition-wall member into a first compartment for air expansion provided with a plurality of first openings each coupled with the other end of one of said first group of inlet passages and a second compartment for air expansion provided with a plurality of second openings each coupled with the other end of one of said second group of inlet passages, said partition-wall member being provided with a cutout portion thereon, and
a valve unit including a body member forming an air passage and a closing valve disposed in the body member for selectively closing the air passage, said valve unit being fitted to said cutout portion provided on the partition-wall member in said surge chamber so as to form with said air passage thereof a connecting passage provided for interconnecting said first and second compartments and selectively closed by said closing valve, and wherein a rear end of the surge chamber is provided with inlet means for admitting air to said first and second compartments, a front end opposite to the rear end being connected thereto by side walls, a first portion of said side walls located on a first side of said partition-wall member having the first openings formed thereon, and a second portion of said side walls located on a second side of said partition-wall member having the second openings formed therein, and wherein the front end is provided with an opening, and wherein the body member of the valve unit comprises a flange portion fixed to the front end of the surge chamber for closing said opening therein and a valve housing engaging within the cutout portion provided on the partition-wall member, and wherein the cutout provided on the partition-wall member is formed at a portion of the partition-wall member close to the front end of the surge chamber, and wherein the closing valve has a rotating shaft with one end thereof projecting outward from the surge chamber through the body member of the valve unit.

11. An air suction device according to claim 10, wherein said closing valve is located at a position that is displaced from said partition-wall member into one of said first and second compartments.

12. An air suction device according to claim 11, wherein one of said first openings which is nearest to said rear end of the surge chamber in said first in said first compartment is closer to said rear end than is one of said second openings which is nearest to said rear end of the surge chamber in said second compartment, and wherein said position at which said closing valve is located is displaced from the partition-wall member into said second compartment.

13. An air suction device according to claim 10, wherein said valve unit comprises an air duct member serving as said body member, said air duct member being engaged with said cutout portion to be mounted on the partition-wall member so as to pass through said partition-wall member for interconnecting said first and second compartments and provided therein with said closing valve.

14. An air suction device according to claim 13, wherein said closing valve is provided at an end portion of said connecting air duct located in one of said first and second compartments.

15. An air suction device according to claim 13, wherein said connecting air duct is elongated along an inner surface of said front end of the surge chamber.

16. An air suction device according to claim 15, wherein one of said first openings which is nearest to said one rear end of the surge chamber in said first compartment closer to said rear end than is one of said second openings which is nearest to said rear end portion of the surge chamber in said second compartment, and wherein said closing valve is provided at an end portion of said connecting air duct located in said second compartment.

17. Air suction device according to claim 10, wherein said opening continuing to said partition-wall member is formed by an open end of said surge chamber and said body member is attached at the rear end of said surge chamber and forms a rear end wall thereof for closing said open end, and wherein, a valve operating device for said rotating shaft is mounted to an outer side of said body member.

18. Air suction device according to claim 10, wherein said opening continuing to the partition-wall member is formed in a rear end wall of the surge chamber, and wherein the valve housing of said body member extends through said rear end wall and where said valve unit is attached to an outer side of said rear end wall by said flange portion.

19. Air suction device according to claim 10 wherein said inlet means comprises a common inlet which divides into a plurality of inlets, and wherein said first and second portions of the sidewalls are on first and second side walls which are disposed on opposite sides of said surge chamber relative to each other.

* * * * *